June 13, 1967 K. C. A. BINGHAM ETAL 3,325,792

THIN FILM MAGNETIC STORAGE DEVICE

Filed Oct. 21, 1963

INVENTORS
KENNETH CHARLES ARTHUR BINGHAM
PETER MOSSMAN
DONALD MARTIN RUSHMER
MICHAEL WILLIAMS
BY Kirschstein, Kirschstein & Ottinger
ATTORNEYS

United States Patent Office 3,325,792

Patented June 13, 1967

3,325,792

THIN FILM MAGNETIC STORAGE DEVICE

Kenneth Charles Arthur Bingham, Chalfont St. Peter, Peter Mossman, Amersham, Donald Martin Rushmer, Ickenham, Middlesex, and Michael Williams, Watford, England, assignors to The General Electric Company Limited, London, England Filed Oct. 21, 1963, Ser. No. 317,432

Claims priority, application Great Britain, Oct. 22, 1962, 39,959/62

10 Claims. (Cl. 340—174)

Figure 1:
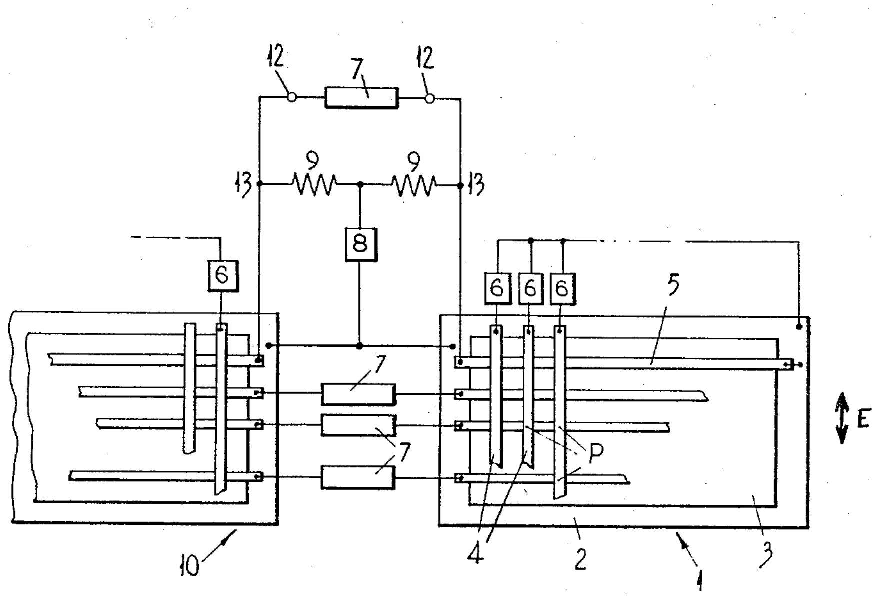

This invention relates to data stores employing magnetic thin film devices, that is to say devices comprising a non-magnetic support member having a smooth surface, and a film of ferromagnetic material formed on said surface, the film having a magnetic anisotropy such that small areas of the film may be caused to behave as individual magnetic domains each having a direction of magnetisation which, in the absence of an applied magnetic field, lies approximately parallel to a particular direction which may be termed the easy axis of the film. In the absence of any external magnetic field applied to such a device, the magnetisation vector of each individual element of the film of the device has two stable directions lying in one or other sense at least approximately parallel to the easy axis of the film. The magnetisation vector of such an element can be switched from one stable direction to the other by applying to the element at least one transitory magnetic field of suitable direction and intensity; such fields may be produced by passing appropriate drive currents through electrically conducting wires or strips (hereinafter termed drive conductors) disposed adjacent the elements in a suitable manner.

The present invention is concerned in particular with data stores of the kind in which, in operation, stored information is represented by the directions of the magnetisation vectors of a plurality of storage elements incorporated in the film of a magnetic thin film device.

According to the present invention, in a data store incorporating a magnetic thin film device, the magnetic thin film of the device is associated with two sets of drive conductors, each drive conductor of each set crossing the drive conductors of the other set in such a manner that, at each crossing point, the axes of the two drive conductors associated with the crossing point are at least approximately at right angles to each other with the axis of one of these two drive conductors at least approximately parallel to the easy axis of the film, each part of the film adjacent a crossing point effectively forming a storage element, and the nature of the film being such that the ratio $H_c/H_k$ for the film is greater than unity, where $H_c$ is the coercivity of the film for a magnetising field along the easy axis of the film and $H_k$ is the anisotropy field associated with the film.

The value of the anisotropy field $H_k$ associated with the film of a magnetic thin film device is given by that value of a steady unidirectional field applied at right angles to the easy axis of the film which is necessary to cause the magnetisation vectors of individual elements of the film to align themselves with this field.

It will be understood that the film may have a certain amount of skew, that is to say the occurrence of small angular displacements of the local easy axes of the parts of the film associated with the individual storage elements from the nominal easy axis of the film.

It will also be understood that the film of the magnetic thin film device of a data store in accordance with the present invention may take the form of a continuous sheet or may comprise discrete areas each including at least one storage element.

Hitherto, it has been thought by those skilled in the art that magnetic thin films for which the ratio $H_c/H_k$ is greater than unity are unsuitable for use in data stores of the kind specified, since it has been thought that in such a case satisfactory switching of the magnetism vectors of the film elements of the store from one stable direction to the other could not be obtained. However, it has been found that in a data store in accordance with the present invention, by virtue of using two sets of crossed drive conductors such that, at each crossing point, the axes of the two drive conductors associated with the crossing point are at least approximately at right angles to each other with the axis of one of these two drive conductors at least approximately parallel to the easy axis of the film, satisfactory switching can be obtained even though the ratio $H_c/H_k$ for the film is greated than unity; further, as will be explained later, such a store has an advantage as regards tolerances in respect of drive currents over a store which is similar to the former store except that the ratio $H_c/H_k$ for the film of the latter store is less than unity. In practice the ratio $H_c/H_k$ will usually be between 1.3 and 3.

One data store in accordance with the invention will now be described by way of example with reference to FIGURES 1 and 2 of the accompanying schematic drawing.

Figure 2:
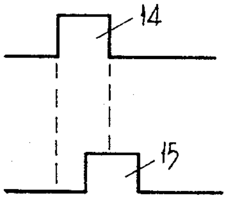

In this arrangement, the data store illustrated in FIGURE 1 includes a magnetic thin film device 1 comprising an aluminium plate 2 having a highly polished planar surface, and a continuous rectangular film of ferromagnetic material 3 formed on this planar surface, the magnetic film being about 0.1 micron thick and being about 10 centimetres by 7.5 centimetres in area; the film consists by weight of about 80% nickel, 17% iron and 3% cobalt. The film is deposited on the aluminium plate by an evaporation technique in the presence of a steady unidirectional magnetic field, the aluminium plate being kept at a temperature of about 320° C. during this evaporation process. The deposited film has an intrinsic uniaxial anisotropy such that it has a nominal easy axis parallel to the shorter dimension of the area of the film, and the nature of the film is such that the coercivity $H_c$ of the film is about 4.0 oersteds while the anisotropy field $H_k$ associated with the film is about 3.0 oersteds.

The magnetic thin film device is overlaid by two sets of drive conductors 4, 5 comprising 25 and 13 conductors respectively (only some of which are shown), each drive conductor being in the form of an elongated rectangular strip of copper 1.0 millimetre wide, the axes of the drive conductors of each set being parallel to one another and being spaced at equal intervals apart. The axes of the drive conductors 4 (hereinafter referred to as the word conductors) are arranged parallel to the norminal easy axis of the film, and the direction of which is indicated by the arrow E, and the other drive conductors 5 (hereinafter referred to as the digit conductors) cross the word conductors at right angles.

Each of the two sets of drive conductors 4, 5 is formed of copper foil 0.025 millimetre thick which is stuck to an electrically insulating film of polyethylene terepthalate (not shown) by means of a pressure-sensitive adhesive, the conductors being formed out of the foil by a known photo-etching technique. The two sets of drive conductors are assembled on the magnetic thin film device with the electrically insulating film of one of the sets in contact with the magnetic film, and with the electrically insulating film of the second set in contact with the electrically conducting strips of the first set, the two sets being secured in position by means of a flexible pressure pad of foamed polyurethane (not shown) overlaying the assembly.

The crossing-points P of the drive conductors define a matrix of storage elements, each storage element being represented by a portion of film overlaid by parts of two drive conductors, one from each set; thus, it will be appreciated that the data store in the example given has a total of 325 storage elements. The matrix of storage elements will be considered as consisting of columns and rows, the word conductors 4 providing the columns and corresponding in number to the number of "words" which the store is capable of storing and the digit conductors 5 providing the rows and corresponding in number to the number of digits in each of the words.

As will be made clear later, the digit conductors 5 also act as sense conductors for the purpose of sensing the direction of the magnetisation vector of each storage element of the store, this direction constituting the coded representation of a digit stored in the relevant storage element.

Corresponding ends of the word conductors 4 are electrically connected to the aluminium plate 2, and similarly corresponding ends of the digit conductors 5 are also electrically connected to the aluminium plate, the connections possibly being made through terminating resistances (not shown) in known manner. The two sets of drive conductors 4, 5 of the device 1 are respectively associated with a plurality of pulse generators 6, 7 each of which is adapted to supply pulses of current to the relevant drive conductor, the aluminium plate 2 providing an electrical connection between an output terminal of each pulse generator and one end of the relevant drive conductor. The digit conductors 5 are also respectively associated with a number of sense amplifiers 8 (only one of which is shown) each of which is adapted to detect the presence of an induced voltage in the relevant digit conductor (when this digit conductor is acting as a sense conductor) and to produce an output signal the polarity of which is dependent on the polarity of the induced voltage. Each digit conductor may, for example, be included in one arm of an appropriate resistive bridge network as shown at 9, incorporating a corresponding digit conductor of an identical store 10, the relevant sense amplifier 8 being connected between the resistive network and the aluminium plate 2, and the output terminals 12 of the relevant pulse generator 7 being connected to opposite terminals 13 of the resistive network and to the ends of corresponding digit conductors 5 of the two stores.

Those pulse generators 6 associated with the word conductors 4 are adapted to supply current pulses in one sense only to the word conductors, whereas each of the pulse generators 7 associated with the digit conductors 5 is adapted to supply current pulses in either sense to the relevant digit conductor, the sense of each digit pulse determining the digit to be written in by the digit pulse.

The operation of the data store will now be described. In order to write a new "word" into a column of the matrix, a current pulse (hereinafter termed a word pulse) having a magnitude of 1.5 amperes is passed through the relevant word conductor 4, while current pulses (hereinafter termed digit pulses) of appropriate polarity and magnitude are respectively passed through all the digit conductors 5; the arrangement is such that the word pulse is applied slightly before the application of the digit pulses, the digit pulses being applied before the cessation of the word pulse and persisting for a short period after the cessation of the word pulse, the relationship of the pulses being indicated in FIGURE 2 in which 14 represents a word pulse and 15 the digit pulse. The initial effect of the passing of the word pulse through this word conductor is to cause the magnetisation vectors of all the storage elements in the appropriate column of the matrix to be rotated in the plane of the film in such a manner that they are directed in the same sense perpendicular to the easy axis of the film. The initial effect of the passing of each digit current is to bias the magnetisation vector of the relevant storage element (that is to say that storage element corresponding to the crossing point of the relevant digit and word conductors) towards one or the other of its stable directions depending on the sense of the digit pulse, so that upon the cessation of the word pulse this magnetisation vector will be rotated into the appropriate stable direction determined by the sense of the digit pulse. Thus it will be appreciated that a digit pulse of one sense can represent the digit "1" say, while a digit pulse of the opposite sense can represent the digit "0" say, and that a stored digit is represented by the direction of the magnetisation vector of a storage element.

It should be understood that it is possible to bring about switching of the magnetisation vector of a storage element from one stable direction to the other without any rotation of the magnetisation vector by passing a current puse of sufficient magnitude in the appropriate sense through the relevant digit conductor 5 in the absence of the passing of a word pulse through the relevant word conductor 4; the magnitude of the minimum digit current (hereinafter termed the disturb threshold) which can bring about such non-rotational switching of the magnetisation vector of a storage element is determined by the coercivity $H_c$ of the film, the greater being $H_c$ the greater being the disturb threshold. Thus, it should be understood that, in operation of the data store, the magnitude of each digit pulse should not be greater than the disturb threshold, since otherwise the writing-in of a digit into a particular storage element would be liable to destroy the information contained in the other storage elements of the relevant row of the matrix.

In order to read the information stored in any column of the matrix, a current pulse (hereinafter termed a reading pulse) is passed through the appropriate word conductor 4. The effect of the passing of this reading pulse is to cause the magnetisation vectors of the storage elements of this column to be rotated into positions in which these magnetisation vectors are all directed in one sense perpendicular to the easy axis of the film. It will be appreciated that the magnetisation vectors of those storage elements of this column in which coded representations of the digit "1" were stored immediately prior to the passing of the reading pulse will be rotated in one sense (clockwise say), while the magnetisation vectors of those storage elements of this column in which coded representations of the digit "0" were stored immediately prior to the passing of the reading pulse will be rotated in the opposite sense (anticlockwise say). Rotation of a magnetisation vector in the clockwise sense will cause a voltage of one polarity to be induced in the relevant digit conductor (which is now acting as a sense conductor), while rotation of a magnetisation vector in the anticlockwise sense will cause a voltage of opposite polarity to be induced in the relevant digit conductor. Thus, it will be appreciated that the polarities of the output signals of the relevant sense amplifiers will represent the digits constituting the information thus read.

It is found that in operation of the data store described above, the tolerances in respect of the digit pulses are wider than they would have been if the ratio $H_c/H_k$ for the film were less than unity. It is thought that the reason for this is as follows. It can be shown that the minimum digit pulse (hereinafter termed the writing threshold) necessary to write-in a digit in a storage element of the store described above is approximately proportional to $H_k\alpha$, for small values of $\alpha$ where $\alpha$ is the so-called skew angle of the part of the film associated with the element, $\alpha$ representing the maximum angular displacement of the magnetisation vector or the storage element from the nominal easy axis of the film. Thus, it will be appreciated that, for a given skew angle $\alpha$, the writing threshold will be proportional to $H_k$. As has been explained previously, the disturb threshold is proportional to $H_c$, and thus the greater is the ratio $H_c/H_k$ the greater will be the tolerance in respect of a digit pulse.

In the specific data store described above, in which $H_c=4$ oersteds and $H_k=3$ oersteds, for a skew angle $\alpha=10°$, the writing threshold is 100 milliamperes while the disturb threshold is 500 milliamperes. On the other hand, if the nature of the film used in the data store were such that $H_c=3$ oersteds and $H_k=6$ oersteds (so that the ratio $H_c/H_k$ is only 0.5), then for the same skew angle, the writing threshold is 200 milliamperes while the disturb threshold is 375 milliamperes.

It has been found that the value of $H_k$ for the film of a magnetic thin film device manufactured by a process involving evaporation of the magnetic material on to the non-magnetic support is dependent on the temperature of the support during the evaporation process, the value of $H_k$ being a minimum for temperatures of the support during the evaporation process, the value of $H_k$ being a minimum for temperatures of the support during the evaporation process of between about 250° C. and 350° C. if the evaporatant has the composition 80% Ni, 17% Fe, 3% Co. Also, it has been found that the value of $H_c$ for the film of a magnetic thin film device is dependent on the thickness of the film, the value of $H_c$ increasing as the thickness of the film decreases. In practice there is a lower limit for the thickness, since the skew of the film increases as the thickness of the film decreases, and the magnitudes of voltages which can be induced in sense conductors associated with the film are relatively low for films of relatively small thickness. It has been found that the optimum thickness of the film of the magnetic thin film device of a data store in accordance with the present invention lies between about 0.07 micron and 0.12 micron.

We claim:

1. A data store incorporating a magnetic thin film device, wherein the magnetic thin film of the device is associated with two sets of drive conductors, each drive conductor of each set crossing the drive conductors of the other set in such a manner that, at each crossing point, the axes of the two drive conductors associated with the crossing point are at least approximately at right angles to each other with the axis of one of these two drive conductors at least approximately parallel to the easy axis of the film, each part of the film adjacent a crossing point effectively forming a storage element, and the nature of the film is such that the ratio $H_c/H_k$ for the film is greater than unity, where $H_c$ is the coercivity of the film for a magnetising field along the easy axis of the film and $H_k$ is the anisotropy field associated with the film.

2. A data store according to claim 1 wherein the ratio $H_c/H_k$ for the film lies between 1.3 and 3.

3. A data store according to claim 2 wherein the ratio $H_c/H_k$ for the film is approximately 4/3.

4. A data store according to claim 1, wherein the thickness of the magnetic thin film lies between 0.07 and 0.12 micron.

5. A data store according to claim 1 incorporating means for applying a current pulse to a selected one of a first set of conductors which, at least at the crossing point of the two sets of conductors extend generally parallel to the easy axis of the film, and means for applying current pulses to each of the second set of conductor before the cessation of the first current pulse but persisting for a period after the cessation of the first current pulse, such that the magnetisation vector of each individual element of the film associated with said conductor of the first set is switched into one or other of its stable directions depending on the sense of the current pulse in the associated one of the second set of conductors.

6. A magnetic thin film device for a data store according to claim 1 comprising a non-magnetic support member having a smooth surface on which there is formed a magnetic thin film having a ratio $H_c/H_k$ which is greater than unity, and two sets of mutually insulated conductors extending across the film at right angles to each other with the conductor of one set approximately parallel to the easy axis of the film, and defining at their intersections a matrix of film storage elements each having two stable states of magnetisation, and the arrangement being such that a change in the stable state of magnetisation of each element can be effected by the passage of electric currents in the appropriate senses through the conductors associated with the elements.

7. A magnetic thin film device according to claim 6 wherein the ratio $H_c/H_k$ for the film lies between 1.3 and 3 and the film has a thickness of between 0.07 and 0.12 micron.

8. A magnetic thin film device according to claim 7 wherein the magnetic thin film consists, by weight, of about 80% nickel, 17% iron and 3% cobalt.

9. The manufacture of a magnetic thin film device according to claim 8 wherein the magnetic thin film applied to the support member by a process of evaporation whilst the support member is heated to a temperature of between 250° C. and 350° C.

10. The manufacture of a magnetic thin film device according to claim 9 wherein the temperature to which the support member is heated during the application of the magnetic thin film is approximately 320° C.

No references cited.

BERNARD KONICK, *Primary Examiner.*

S. SPERBER, *Assistant Examiner.*